United States Patent [19]
Ando et al.

[11] Patent Number: 5,745,491
[45] Date of Patent: Apr. 28, 1998

[54] INFORMATION STORAGE AND OUTPUT SYSTEM

[75] Inventors: Ichiro Ando, Yokosuka, Japan; Masato Matsuzawa, Berkshire, United Kingdom

[73] Assignee: Victor Company of Japan, Ltd., Yokohama, Japan

[21] Appl. No.: 700,832

[22] Filed: Aug. 21, 1996

[30] Foreign Application Priority Data

Aug. 31, 1995 [JP] Japan ................... 7-248472
Feb. 29, 1996 [JP] Japan ................... 8-070998

[51] Int. Cl.⁶ ................................ H04J 3/22
[52] U.S. Cl. .................. 370/428; 370/538; 370/487; 370/468
[58] Field of Search ...................... 370/253, 412, 370/428, 429, 522, 529, 537, 545, 538, 477, 487, 468; 375/225; 348/385, 384

[56] References Cited

U.S. PATENT DOCUMENTS 5,509,013  4/1996  Adachi et al. ............ 370/538
5,515,368  5/1996  Saito et al. ............... 370/468
5,671,156  9/1997  Weerackody et al. ...... 370/487

FOREIGN PATENT DOCUMENTS

2188082  7/1990  Japan.

*Primary Examiner*—Douglas W. Olms
*Assistant Examiner*—Ricky Q. Ngo
*Attorney, Agent, or Firm*—Pollock, Vande Sande & Priddy

[57] ABSTRACT

A system for storing variable transfer rate data sets and for multiplexing and outputting requested data sets on demand, comprises a memory for storing transfer rate information for each of the variable transfer rate data sets. On receiving a request for one of the data sets, an output start timing for the requested data set is set for such an earliest frame that, if the output of the requested data set is started at the frame period, the total transfer rate does not exceed a predetermined transfer rate throughout the transmission period of the requested data set.

6 Claims, 7 Drawing Sheets

Hereinafter, we call a coding cycle a "frame" and assume the length of a frame to be T sec.

Packet size information for each of the data sets or the video programs consists of a series of the data sizes (Mb) of the packets for the frames constituting the video program as shown in TABLE 1.

TABLE 1

| Program | Packet Size (× T Mb) | | | | | | | | | |
|---------|----|----|----|----|----|----|----|----|----|-----|
| Pa      | 3  | 2  | 4  | 2  | 5  | 2  | 3  | 3  | 2  | 4   |
| Pb      | 1  | 4  | 2  | 7  | 2  | 2  | 5  | 2  | 4  | 1   |
| Pc      | 3  | 5  | 6  | 4  | 3  | 1  | 3  | 2  | 1  | 2   |
| Time→0  | 1T | 2T | 3T | 4T | 5T | 6T | 7T | 8T | 9T | 10T |

Figure 1:
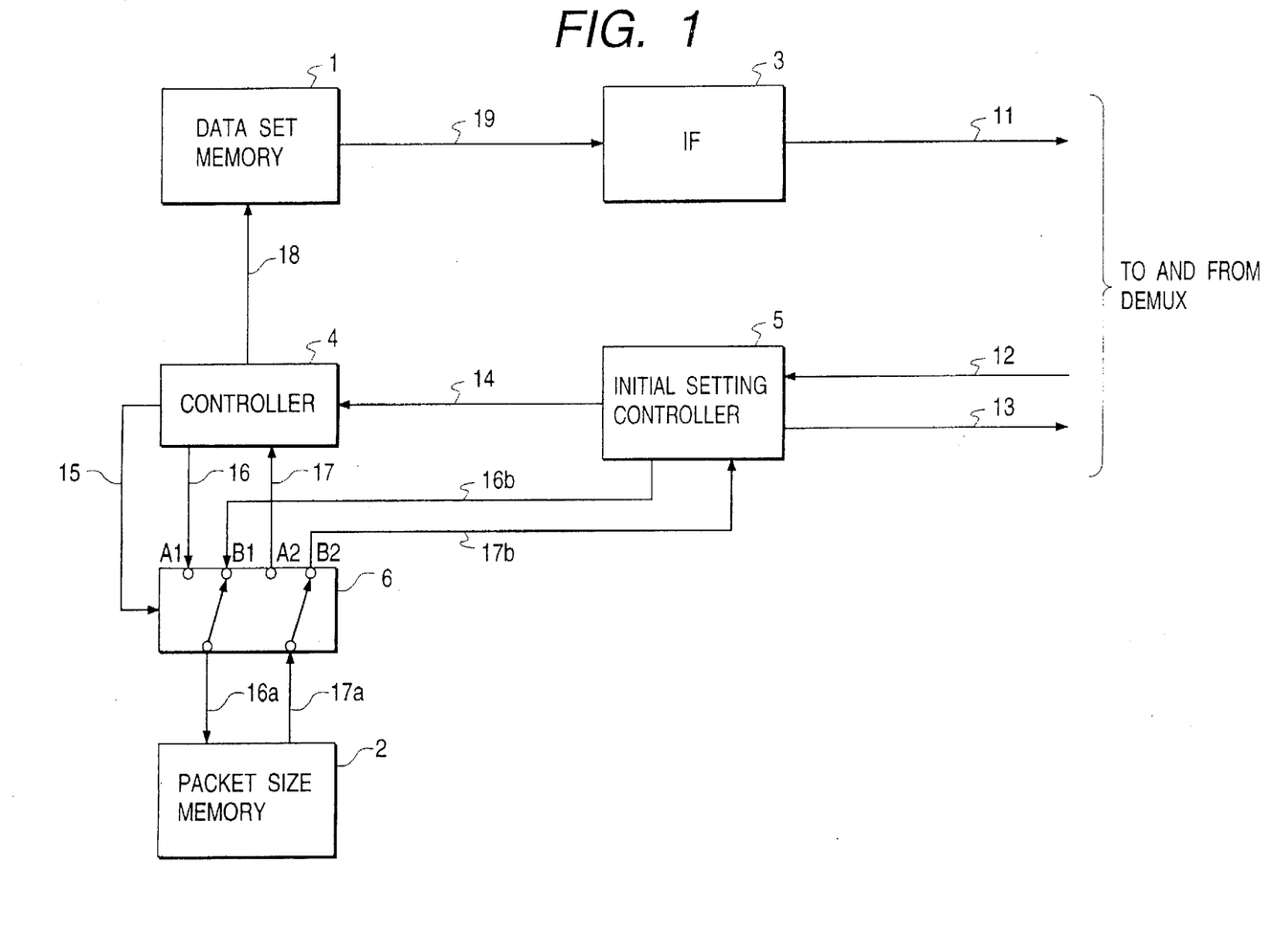

In operation, if the controller 4 receives a program output start instruction 14 from the initial setting controller 5, the controller 4 turns the dual switch 6 to A-side through line 15 so as to be connected with the packet size memory 2 through address bus and control lines denoted en bloc by numerals 16 and 16a, a terminal A1 of the switch 6 and data bus 17a and 17 and a switch 6 terminal A2, and reads packet size information on a requested program from the memory 2. On the basis of the just read packet size information and the packet size information on the program outputs which have been already started, the controller 4 controls the program outputs from the data set memory 1 with respect to the requests which have not been fulfilled so as to cause multiplexed packets 19 associated with the unfulfilled request to be output to a line interface (IF) 3. Then, the multiplexed packets are output through the line interface 3 to a demultiplexer (not shown), which in turn delivers each of the packets to the terminal (not shown) to which the packet has been addressed.

In order for the simplicity of the following description, we define an expression of a packet size sequence. The packet size sequence of a program, for example, Pa in case when a readout of the program Pa is started at time tn (n=1, 2, ... ) is expressed as Pan. If the readout of program Pa is started at tome t3, then the packet size sequence of the packets which are allocated to the program Pa and appear on the line 19 is written as Pa3, and from the TABLE 1, Pa3=0, 0, 0, 3, 2, 4, 2, 5, 2, 3, 3, 2, 4, 0, 0, ...

Figure 2:
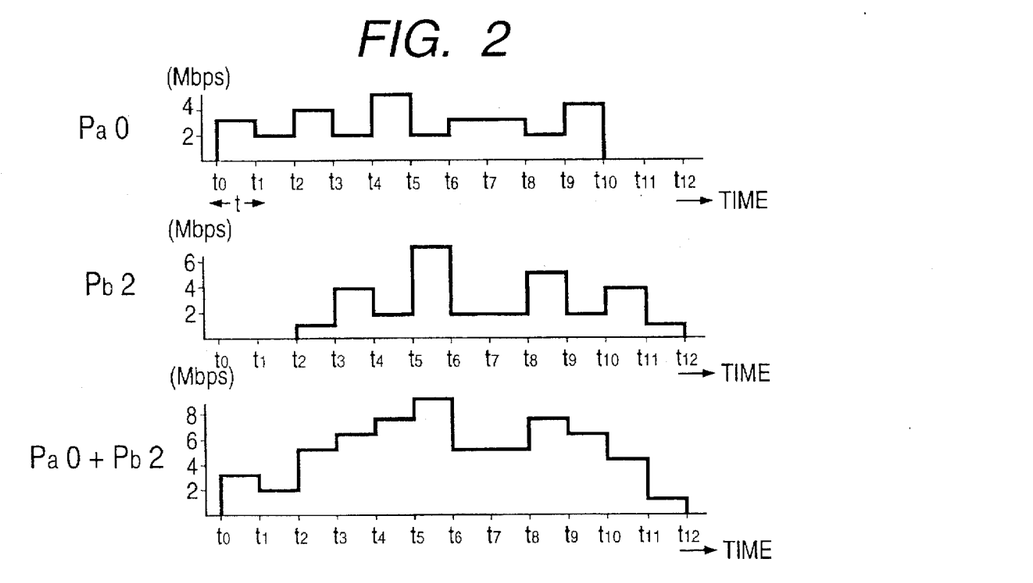

Referring now to FIG. 2, there is shown in the form of graphs some exemplary packet size sequences for packets read from the data set memory 1 shown in FIG. 1. If the readouts for programs Pa and Pb are started at times t0 and t2 as shown as Pa0 and Pb2 in FIG. 2, respectively, in the period from t0 to t2 only the program Pa is read and multiplexed, in the period from t2 to t10 the programs Pa and Pb are read in each frame in a time division multiplexing way according to the packet size associated with the frame, in the period from t10 to t12 only the program Pb is read and multiplexed. In this case, the reading rate and the multiplexing or outputting rate are identical and shown as Pa0+Pb2 in FIG. 2.

Again in FIG. 1, once the controller 4 have read necessary packet size information from the packet size memory 2, the controller 4 turns the dual switch 6 to B-side so as to permit the initial setting controller 5 to read the memory 2 through address bus and control lines denoted en bloc by numerals 16b and 16a, a terminal B1 of the switch 6 and data bus 17a and 17b and a switch 6 terminal B2.

If the initial setting controller 5 receives a request for one of the data sets stored in the data set memory 1 from one of the terminals (not shown) served by the demultiplexer (not shown) via the demultiplexer and the line 12, the initial setting controller 5 calculates such an earliest output start time (frame) that if the program readout for the request is started at the earliest output time, the total volume of packets to be read out or output in each frame period does not exceed a predetermined readout or output capacity per frame, CRO (Mb/frame), throughout the transmission period of the requested program.

Specifically, if an output of the program Pa and an output of the program Pb have been started respectively at times t0 and t2 and the initial setting controller 5 receives a request for program Px (x=a, b, or c) in a period from time ti to t(i+1) (i=2, 3, ... ), then the initial setting controller 5 calculates an earliest output start time (frame) after time t(i+1). If the total volume sequence of the programs the output of which have been already started is written as "Pcur", then, Pcur= Pa0+Pb2 in this example. The calculation is done in the following manner.

For integers n=1, 2, ... , L+1, where (L+1)×T−1×T=the length of the program, beginning with n=1, the initial setting controller 5 makes a test to see if:

$$Pcur+Px(i+n) \leq CRO \qquad (1)$$

for each frame n frames after the reception of a request for one of the programs. If the results of the tests for all the values of Px(i+1) are YES, the earliest output start time is set for the first frame from the frame in which the program request was received, that is, time t(i+1). Otherwise, incrementing n, the initial setting controller 5 repeats the above test sequence till a test sequence the results of which are all YES is found. If the initial setting controller 5 have found such a test sequence Pcur+Px(i+N), ($2 \leq N \leq L+1$), then the initial setting controller 5 set the output start time for t(i+N).

Specifically, the initial setting controller 5 informs the requesting terminal via the demultiplexer of the possibility of starting the output of the program Px at time t(i+N), and in response to an acknowledgement from the requesting terminal, sends an instruction to start the output of the program Px at time t(i+N) to the controller 4.

Figure 3:
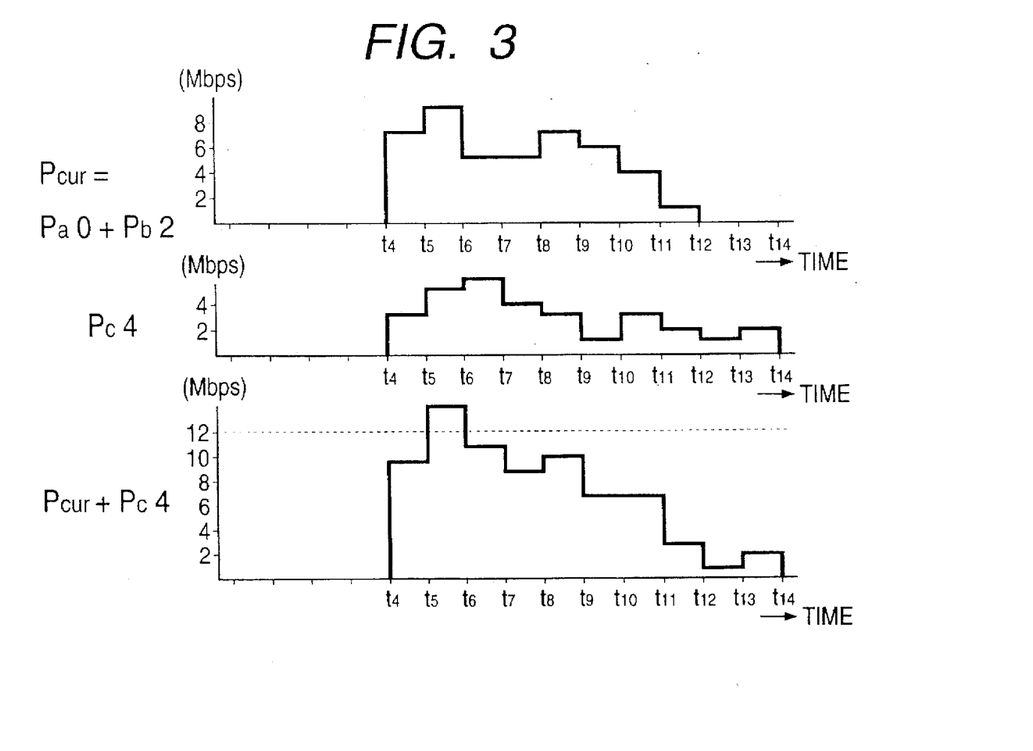

As the first test sequence, assuming that the readout capacity per frame and the output capacity per frame are identical to 12×T Mb/frame (=12 Mbps) and a readout or output of the program Pc is started at t4, a packet size sequence Pc4 is added to the current total volume sequence Pcur=Pa0+Pb2 to yield a trial total volume sequence Pcur+ Pc4 as shown in FIG. 3. As is apparent from FIG. 3, the trial total volume sequence becomes 14×T Mb/frame (exceeds the per-frame readout or output capacity CRO=12×T Mb/frame) in a frame ranging from t5 to t6, resulting in a loss of data in a frame from t5 to t6.

Figure 4:
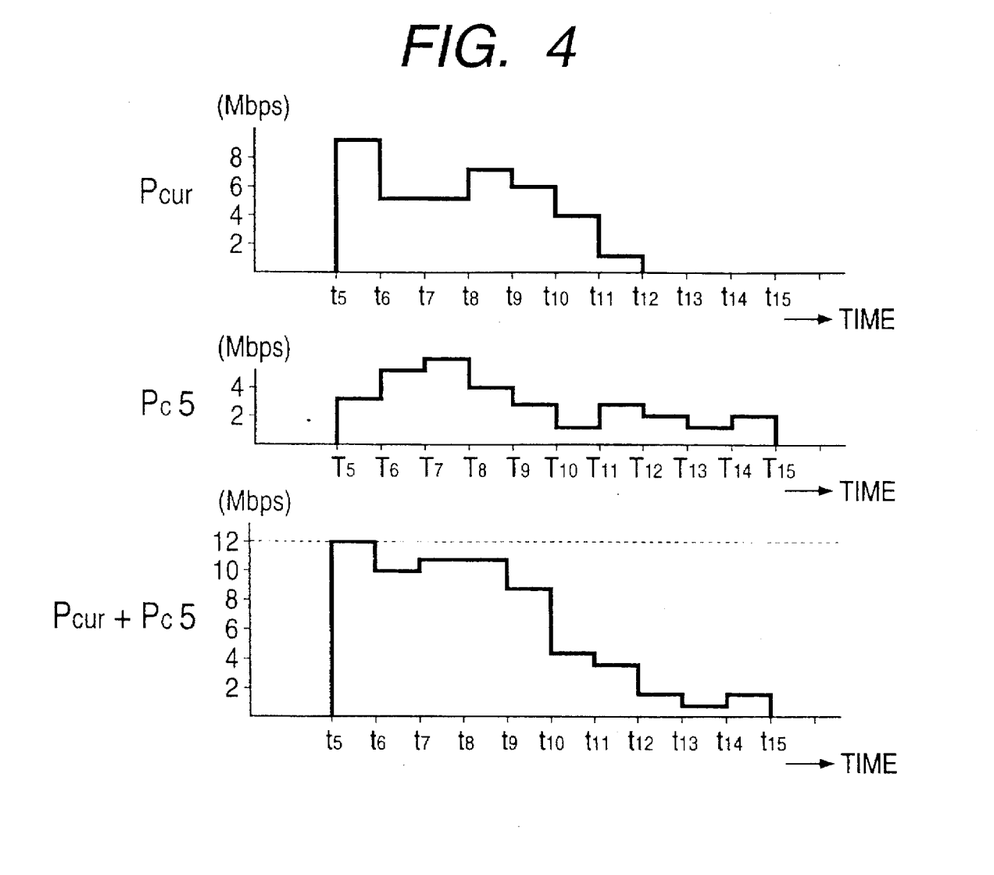

As the second test sequence, assuming that a readout or output of the program Pc is started at t5, a packet size sequence Pc5 is added to the current total volume sequence Pcur=Pa0+Pb2 to yield a trial total volume sequence Pcur+ Pc5 as shown in FIG. 4. As is apparent from FIG. 4, the trial total volume sequence dose not exceed CRO=12×T Mb/frame in any frame, resulting in no loss of data in all the time of the program.

Apparently, selecting each program output start in this way ensures high quality program reproduction. However, the insurance is valid only when all the outputs are carried out continuously without any pause in any output. A receiving terminal may want to temporary stop and resume the program. In order to cope with this problem, the initial setting controller 5 may perform the following control.

After finding the output start time t(i+N), the initial setting controller 5 makes the following test using a predetermined positive integer W for each frame from tj to t(i+L+1) for each of the cases where j=j, j+1, j+2, . . . , j+W and/or N=N, N+1, N+2, . . . , N+W.

$$Ppre+Pyj+Px(i+N) \leq CRO, \quad (2)$$

where Pyj is the packet size sequence for a program Py (y=a, b, or c) the output of which has been started last, tj (j<i) is a start time of the last started program Py, and Ppre is the total volume sequence of the programs the output of which have been already before tj.

If the results of a series of the tests (2) are all YES, then it is ensured that even if in response to a pause request from a terminal the program output associated with the requesting terminal is temporarily stopped, a loss of data will never occur as long as the total pause number of frames with respect to each program output does not exceed the predetermined positive integer W.

If for example W=2, a program Pa has been started at t0, and a program b is to be started at t2, then the test (2) is made for each frame for each of the following 9 cases:

Pa0+Pb2≦CRO

Pa1+Pb2≦CRO

Pa2+Pb2≦CRO

Pa0+Pb3≦CRO

Pa1+Pb3≦CRO

Pa2+Pb3≦CRO

Pa0+Pb4≦CRO

Pa1+Pb4≦CRO

Pa2+Pb4≦CRO

If the above tests are successful for all the relevant frames, the output of the program Pb can be started, and it is ensured that even if the output(s) of the program(s) Pa and/or Pb is (or are) temporarily stopped, a loss of data will never occur as long as the total pause number of frames for each program output does not exceed 2.

Embodiment II

Figure 5:
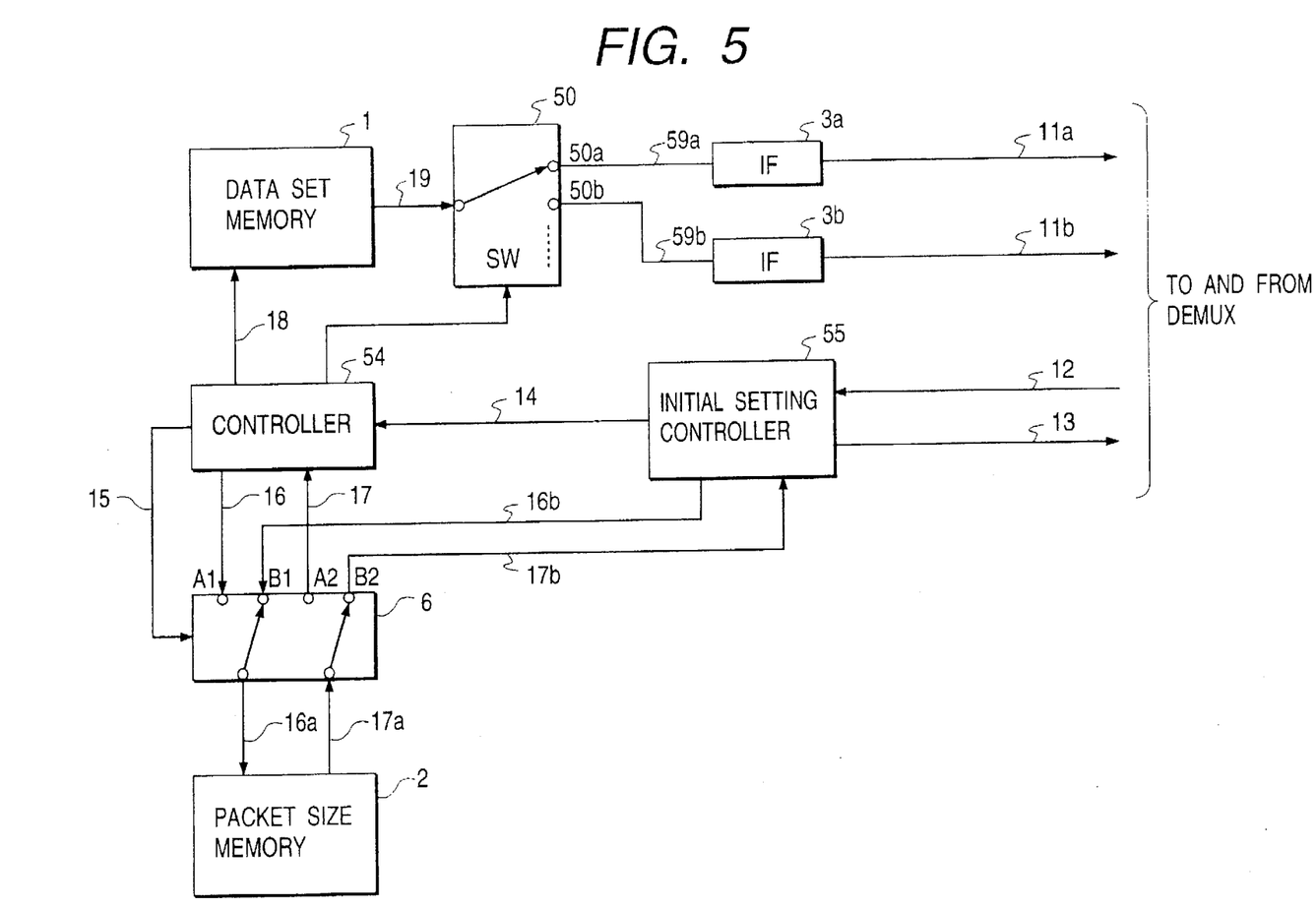

FIG. 5 is a block diagram showing a second illustrative embodiment of an information storage and output system of the invention. Since the data set memory 1, the packet size memory 2, the line interfaces (IFs) 3a and 3b, and the dual switch 6 in FIG. 5 are identical to those of FIG. 1, like elements are given like reference characters except for the line interfaces. In FIG. 5, the output of the data set memory 1 is connected to the common terminal of an alternate switch 50, which in turn has two contacts connected to the line interfaces 3a and 3b through lines 59a and 59b, respectively. A controller 54 and an initial setting controller 55 are substitutes for the controller 4 and the initial setting controller 55 of FIG. 1, respectively. Hereinafter, an output path along the switch 50 terminal 50a, line 59a, IF 3a and output line 11a is simply referred to as "output path 50a", and the other output path along the switch 50 terminal 50b, line 59b, IF 3b and output line 11b is referred to as "output path 50b".

In operation, if the controller 54 receives a program output start instruction and a line select instruction from the initial setting controller 55 via line 14, the controller 54 turns the dual switch 6 to A-side through line 15 so as to be connected with the packet size memory 2 through address bus and control lines denoted en bloc by numerals 16 and 16a, a terminal A1 of the switch 6 and data bus 17a and 17 and a switch 6 terminal A2, and reads packet size information on a requested program from the memory 2. On the basis of the just read packet size information and the packet size information on the program outputs which have been already started, the controller 54 controls not only the program outputs from the data set memory 1 with respect to the requests which have not been fulfilled but also operation of the alternate switch 50 so as to cause two sets of multiplexed packets associated with the unfulfilled request to be output to the line interfaces (IF) 3a and 3b. Then, the two sets of multiplexed packets are output through the line interfaces 3a and 3b to respective demultiplexers (not shown), which each deliver each of respective set of multiplexed packets to the terminal (not shown) to which the packet has been addressed.

Figure 6:
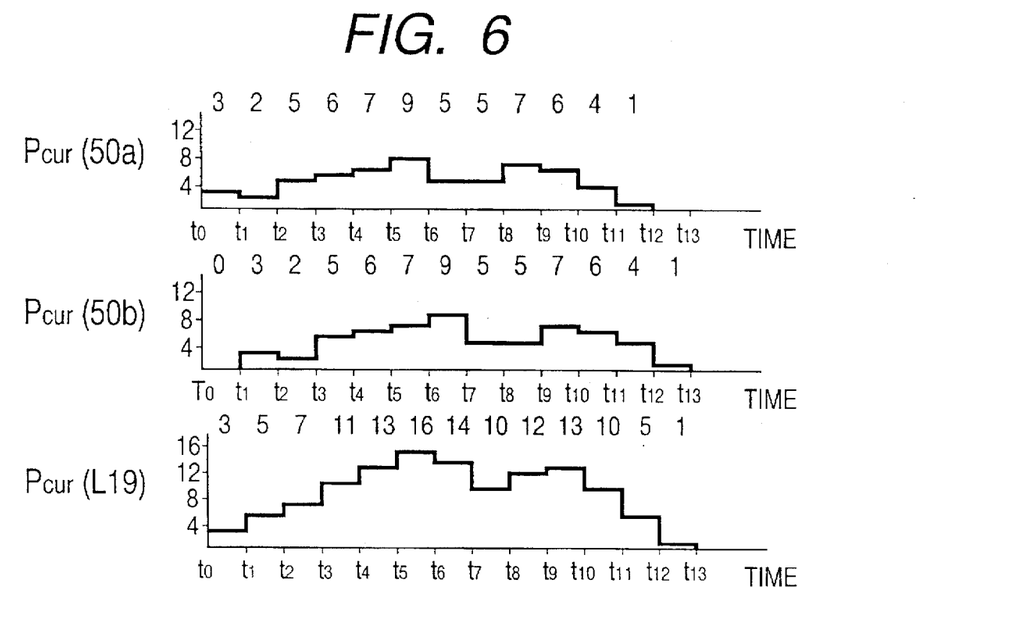

According to the same notation as used in the description of the basic concept, we discuss changes in data volume in multiplexing. FIG. 6 is a diagram showing graphs of the total volume sequences of the multiplexed packet data on output paths 50a and 50b, and the total volume sequence of readout data from the data set memory 1. That is, assuming that the program readout of the data set memory 1 and the shift of the switch 50 is so controlled by the controller 54 that, for example, programs Pa and Pb the readouts of which is started respectively at time t0 and t2 is output through the output path 50a and programs Pa and Pb the readouts of which is started respectively at time t1 and t3 is output through the output path 50b, FIG. 6 shows for a period from t0 to t12:

Pcur on output path 50a=Pa0+Pb2;

Pcur on output path 50b=Pa1+Pb3; and

Pcur on line 19=Pa0+Pa1+Pb2+Pb3.

Returning to FIG. 5, once the controller 54 have read necessary packet size information from the packet size memory 2, the controller 54 turns the dual switch 6 to B-side so as to permit the initial setting controller 5 to read the memory 2 through address bus and control lines denoted en bloc by numerals 16b and 16a, a terminal B1 of the switch 6 and data bus 17a and 17b and a switch 6 terminal B2.

If the initial setting controller 55 receives a request for one of the data sets stored in the data set memory 1 from one of the terminals (not shown) served by the demultiplexer (not shown) via the demultiplexer and the line 12, the initial setting controller 55 calculates for each of the output paths 50a and 50b such an earliest output start time (frame) that if the program readout for the request is started at the earliest output time, neither the total volumes of packets to be read out nor to be output in each frame period exceed a predetermined per-frame readout capacity CR (Mb/frame) or a predetermined per-frame output capacity CO (Mb/frame) throughout the transmission period of the requested program. The initial setting controller 55 selects the earliest one from the calculated output times, which results in a selection of the output path used for the program output, and informs the requesting terminal via the demultiplexer of the selected output time and information on the selected output path. In response to an acknowledgement from the requesting terminal, the initial setting controller 55 sends to the controller 54 an instruction to start the output of the program to the selected output path at the selected output time.

It is noted that the information on the selected output path includes a carrier frequency for use in case when the multiplexed packet to be output via the selected path is transmitted by wireless and the channel number associated with the requesting terminal, and is used by the requesting terminal for reception of the requested program.

In the example shown in FIG. 6, if the initial setting controller 55 receives a request for the program Pc at time t4, then the initial setting controller 55 finds an earliest output start time (frame) after time t5 and an output path to be used that will not cause any loss of data.

Specifically, for integers n=1, 2, . . . , L+1, where (L+1)×T−1×T=the length of the program Pc (L=10 in this case), beginning with n=1, the initial setting controller 5 makes a test to see if:

Pcur(L19)+Pc (4+n)≦CR, and

Pcur(50a)+Pc (4+n)≦CO for each frame n frames after the reception of a request for one of the programs, where Pcur(L19) is Pcur on line 19, and Pcur(50a) is Pcur on output path 50a. If a test sequence the results of which are all YES is found for n=N, then the earliest output time for the path 50a is t(4+N). In the same way, the earliest output time for the path 50b is found using:

Pcur(L19)+Pc(4+n)≦CR, and

Pcur(50b)+Pc(4+n)≦CO

Figure 7:
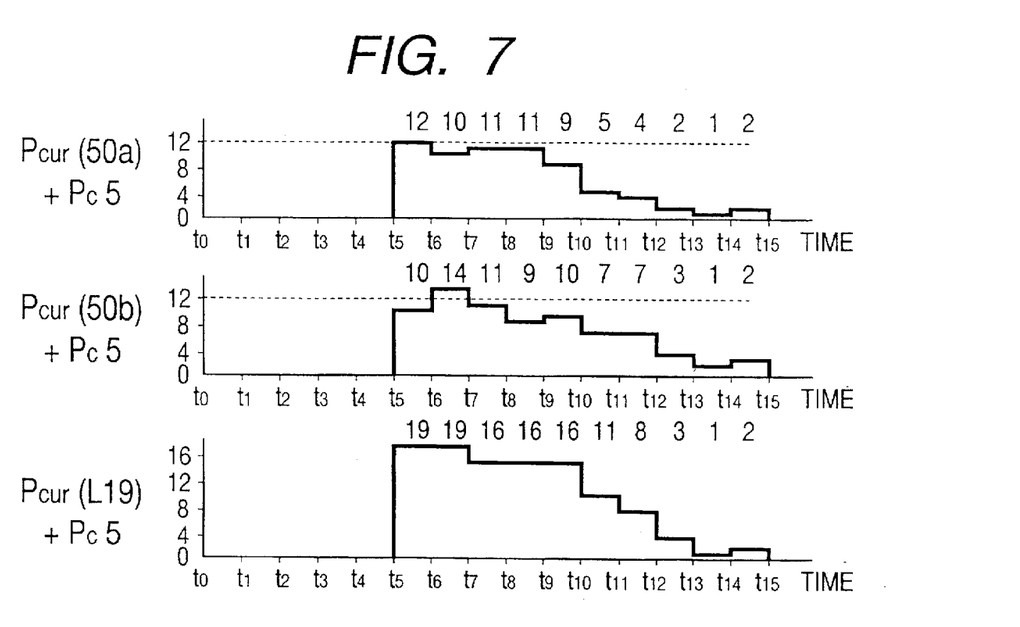

FIG. 7 is a diagram showing graphs of trial total volume sequences of the multiplexed packet data on output paths 50a and 50b, and a trial total volume sequence of readout data 19 from the data set memory 1. In FIG. 7, it is assumed that the output rate from the memory 1 is 24 Mbps, and the output rate of each output path 50a, 50b is 12 Mbps. Then, the per-frame readout capacity CO is 24×T Mb/frame and the per-frame output capacity of each output path 50a, 50b is 12×T Mb/frame.

If a program Pc the readout of which has been started at t5 is output via path 50a, the total volume per frame on path 50a or Pcur(50a)+Pc5 never exceeds CO through the frames from t5 to t15 as shown as Pcur(50a)+Pc5 in FIG. 7. On the other hand, if a program Pc the readout of which has been started at t5 is output via path 50b, the total volume per frame on path 50b or Pcur(50b)+Pc5 exceeds CO in a period from t6 to t7 as shown as Pcur (50b)+Pc5 in FIG. 7. In either case, the total readout volume never exceeds the per-frame readout capacity CR=12×T Mb/frame.

Accordingly, the initial setting controller 55 informs the requesting terminal via the demultiplexer of the possibility of starting the output of the program Pc at time t5, and in response to the acknowledgement from the requesting terminal, sends an instruction to start the output of the program Pc at time t5 using the output path 50a to the controller 54.

Though this embodiment has two output lines 11a and 11b, the invention can be embodied as an information storage and output system with more than two output lines.

Modifications

Information storage and output systems with one or more buffer circuits will be described in the following.

Figure 8:
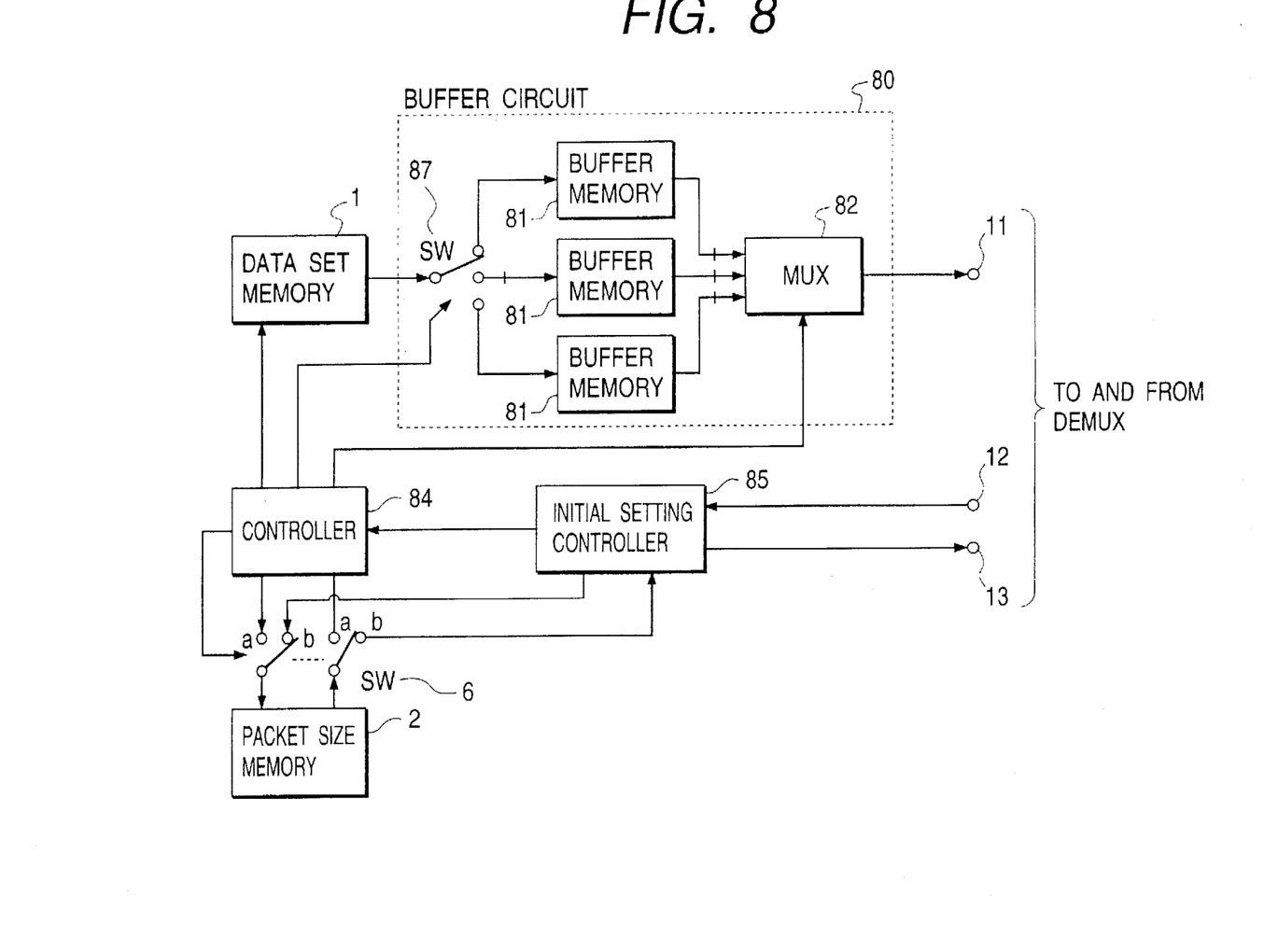

FIG. 8 shows an exemplary modification of the information storage and output system of the type shown in FIG. 1 with a buffer circuit. FIG. 8 is identical to FIG. 1 except that the line interface 3 of FIG. 1 has been replaced by a buffer circuit 80 in FIG. 8. Accordingly, operations of a controller 84 and an initial setting controller 85 are little different from those of the corresponding elements.

In operation, each of the packets read from the data set memory 1 is sequentially passed to one of the buffer memories 81 allocated to the terminal which has requested the program to which the packet belongs, and stored temporarily in the buffer memory 81. The packets stored in each buffer memory 81 is sequentially multiplexed and output by the multiplexer (MUX) 82 under the control of the controller 84.

If a hard disk is used for the data set memory 1, a readout from the memory 1 is generally done by a large volume in order to reduce the frequency of accesses to the memory 1 because the access time is larger as compared with the reading rate in a hard disk. On the other hand, the output packet size is tend to be made smaller for the reduction in buffer size in the demultiplexer (not shown). Therefore, in such a case, the buffer memories 81 are used for matching a larger reading rate to a smaller output rate.

If the reading rate of the data set memory 1 is substantially larger than the output rate permitting the access time of the memory 1 to be ignored, it is not necessary to provide each terminal (not shown) with a buffer memory 81. Only one buffer memory 81 for one buffer circuit 80 will suffice for matching the reading rate to the output rate.

If the reading rate and the accessing rate of the data set memory 1 and the output rate of the multiplexer (MUX) 82 are identical to one another as in case when the data set memory 1 consists of SRAM (static random access memory), the buffer circuit 80 is not necessary.

Figure 9:
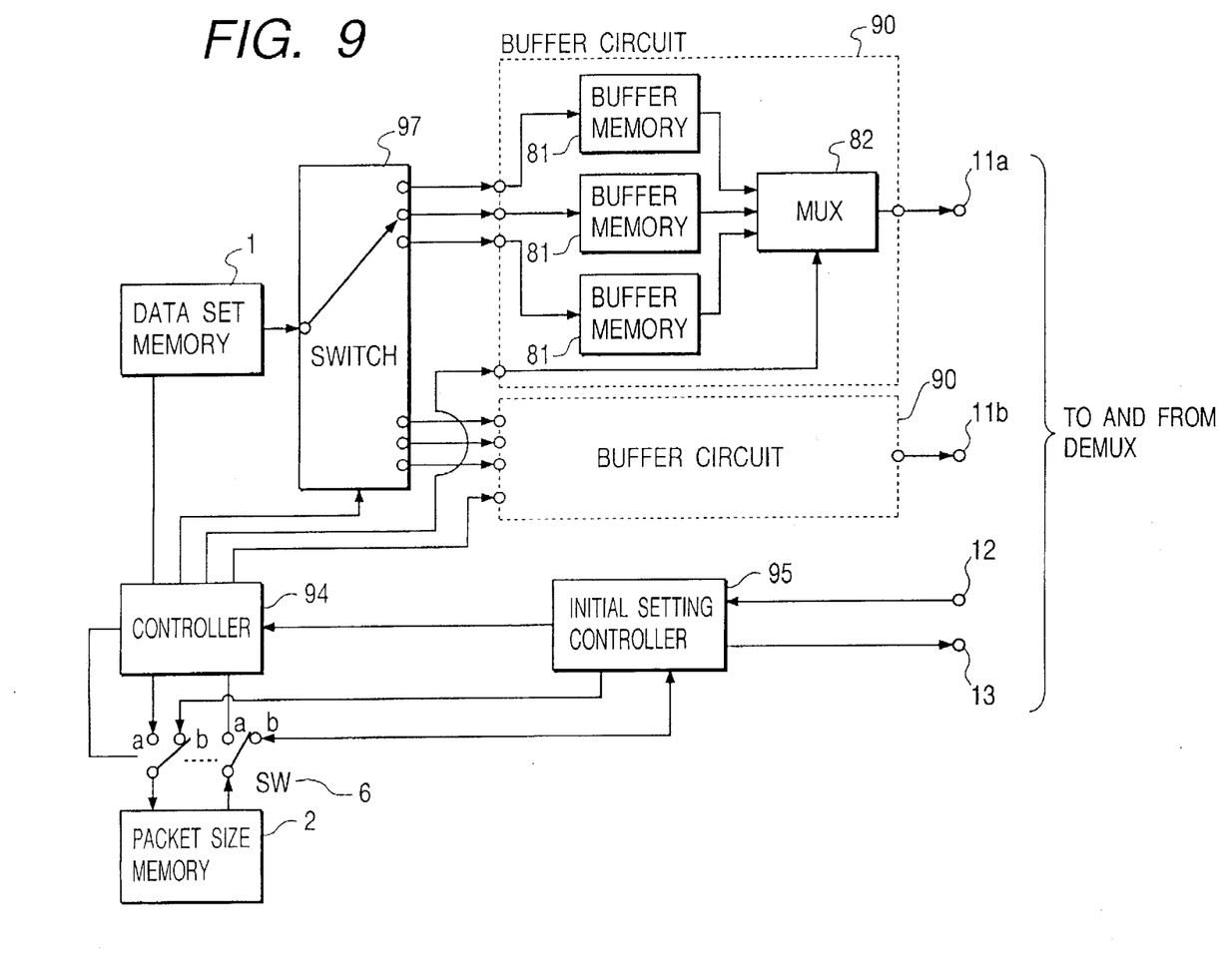

FIG. 9 is a diagram showing another exemplary modification of the information storage and output system of the type shown in FIG. 5 wherein each output line is provided with a buffer circuit. FIG. 9 is very similar to FIG. 5 except that each of the line interfaces 3 of FIG. 5 has been replaced by a buffer circuit 90 in FIG. 9, and accordingly the number of the switch contacts 50 are multiplied by the number of buffer memories 81 in FIG. 9. Again, operations of a controller 94 and an initial setting controller 95 are little different from those of the corresponding elements.

Each of the packets read from the data set memory 1 are routed through the switch 97 under the control of the controller 94 to a buffer circuit 90 buffer memory 81 allocated to the terminal which has requested the program to which the packet belongs, and stored temporarily in the buffer memory 81. The packets stored in each buffer memory 81 is sequentially multiplexed and output by the multiplexer (MUX) 82 under the control of the controller 94.

Though we have used a term "packet size" to facilitate the understanding, the same discussion is also possible by using "transfer rate". In this case, the packet size memory 2 would be a transfer rate memory.

Many widely different embodiments of the present invention may be constructed without departing from the spirit and scope of the present invention. It should be understood that the present invention is not limited to the specific embodiments described in the specification, except as defined in the appended claims.

We claim:

1. A system for storing a plurality of variable transfer rate data sets and, responsive to a request for one of said data sets from one of a plurality of terminals, for multiplexing and outputting the requested one of said plurality of data sets with other channel packets which are currently being output, the system comprising:

means for storing transfer rate information for each of said plurality of variable transfer rate data sets; and means responsive to said request for one of said data sets for setting, on the basis of said transfer rate information, a start time for multiplexing and outputting said requested data set for such an earliest frame that, if the output of said requested data set is started at said earliest frame, the total transfer rate does not exceed a predetermined transfer rate throughout the transmission period of said requested data set.

2. The system as defined in claim 1, wherein said means for setting a start time further comprises:

means operative in conjunction of said setting of said start time for making a test, for each of the cases when said start time for multiplexing and outputting said requested data set and/or the multiplexing and outputting of the just previously requested data set is or are delayed for up to a predetermined pause count of frames, to see if the total transfer rate does not exceed a predetermined transfer rate throughout the transmission period for the case, the system further comprising:

means, responsive to a determination that said test was successful and to a pause request from one of the terminals of said terminals which have been requested and are currently receiving respective variable transfer rate data sets, for temporarily stopping the multiplexing and outputting associated with the terminal which has issued said pause request as long as the total number of pause frames for which said multiplexing and outputting associated with said terminal has been stopped does not exceeds said predetermined pause count.

3. A system for storing a plurality of variable transfer rate data sets and, responsive to a request for one of said data sets from one of a plurality of terminals, for multiplexing and outputting the requested one of said plurality of data sets with other channel packets which are currently being output, the system comprising:

a plurality of transmission lines, connected to a demultiplexer serving said plurality of terminals, for use in said outputting;

switching means for connecting each of multiplexed packets to one of said plurality of transmission lines which is associated with said each of said multiplexed packets;

means for storing transfer rate information for each of said plurality of variable transfer rate data sets; and means responsive to said request and operative on the basis of said transfer rate information stored in said storing means for finding, to each of said plurality of transmission lines, such an earliest frame that, if the output of said requested data set onto the transmission line is started at said earliest frame, the total transfer rate does not exceed a predetermined transfer rate for said transmission line throughout the transmission period of said requested data set, and for selecting an earliest one of the found earliest frames as a start time for multiplexing and outputting of said requested data set and causing a transmission line which provides said earliest one of said found earliest frames to be used for outputting of said requested data.

4. The system as defined in claim 3, wherein said means for finding and for selecting and causing further comprises:

means responsive to said selecting an earliest one of the found earliest frames as a start time for making a test with respect to the transmission line to be used for outputting of said requested data, for each of the cases when said start time for multiplexing and outputting said requested data set and/or the multiplexing and outputting which has been last started on said transmission line to be used for outputting of said requested data is or are delayed for up to a predetermined pause count of frames, to see if the total transfer rate on said transmission line to be used for outputting of said requested data does not exceed a predetermined transfer rate throughout the transmission period for the case, the system further comprising:

means, responsive to a determination that said test was successful and to a pause request from one of the terminals of said terminals which have been requested and are currently receiving respective variable transfer rate data sets, for temporarily stopping the multiplexing and outputting associated with the terminal which has issued said pause request as long as the total number of pause frames for which said multiplexing and outputting associated with said terminal has been stopped does not exceeds said predetermined pause count.

5. The system as defined in claim 1, further comprising buffer means connected to the other end of said transmission line, read data from said plurality of stored variable transfer rate data sets being supplied to said transmission line through said buffer means.

6. The system as defined in claim 3, further comprising:

a plurality of buffer means, having an input portion thereof connected to an output portion of said switching means and an output terminal thereof connected to the other end of each of said plurality of transmission lines, for temporarily storing and outputting received packets from said switching means onto said other end of said transmission lines as multiplexed packets.

* * * * *